(No Model.) 2 Sheets—Sheet 1.
J. C. GALLAGHER.
PROCESS OF AND APPARATUS FOR GENERATING ACETYLENE GAS.
No. 589,713. Patented Sept. 7, 1897.
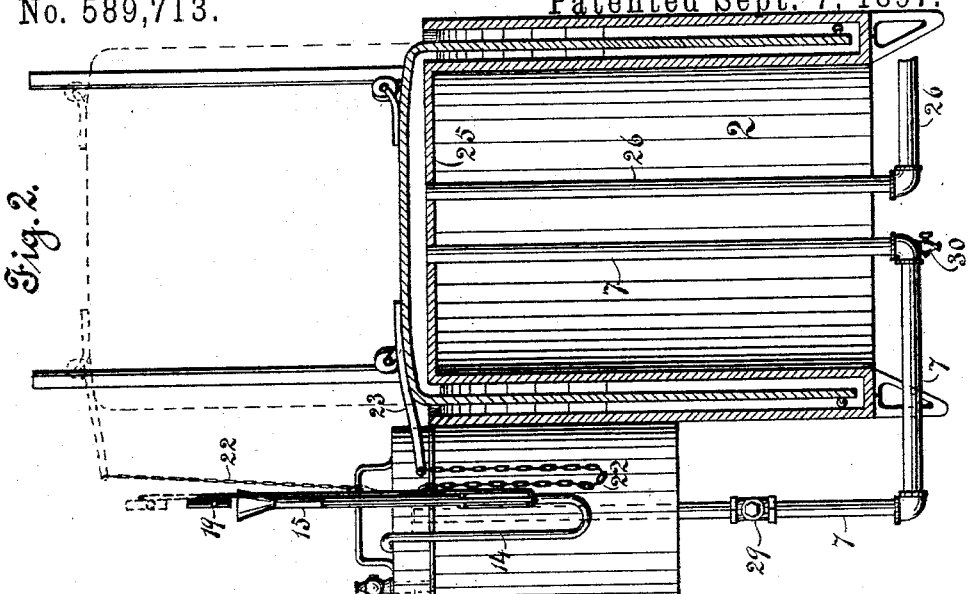
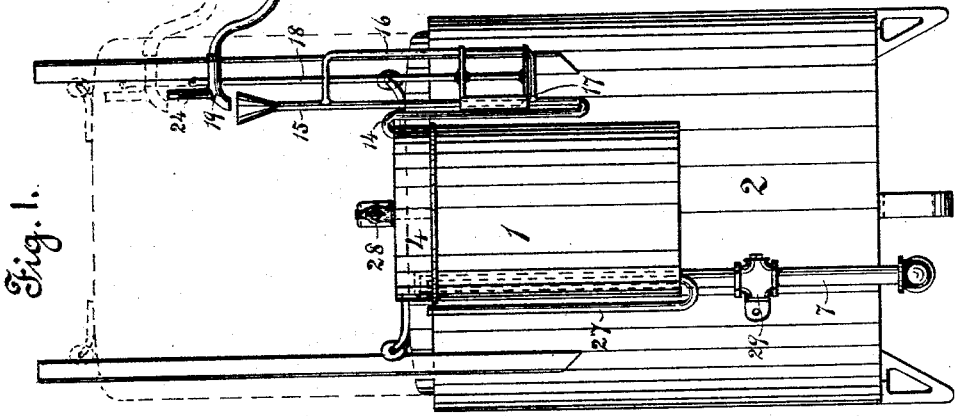
Witnesses
A. S. Diven
H. H. Mills
Inventor
John C. Gallagher
by Eugene Diven
Attorney (No Model.) 2 Sheets—Sheet 2.
J. C. GALLAGHER.
PROCESS OF AND APPARATUS FOR GENERATING ACETYLENE GAS.
No. 589,713. Patented Sept. 7, 1897.
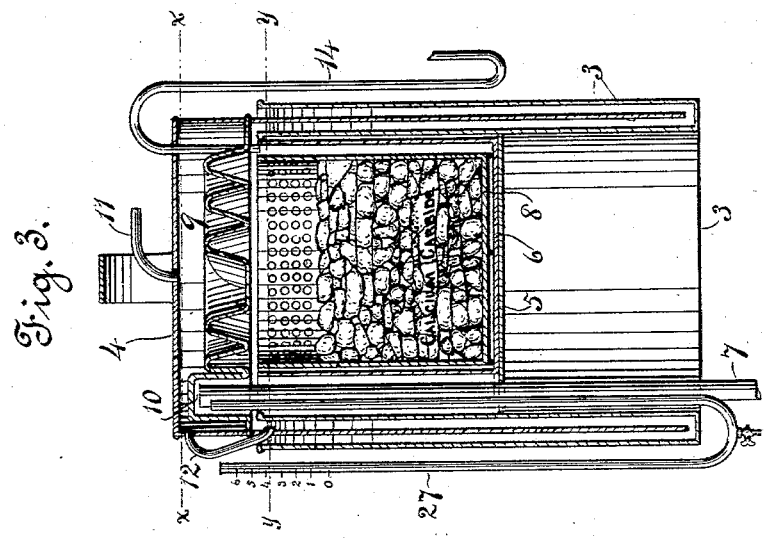
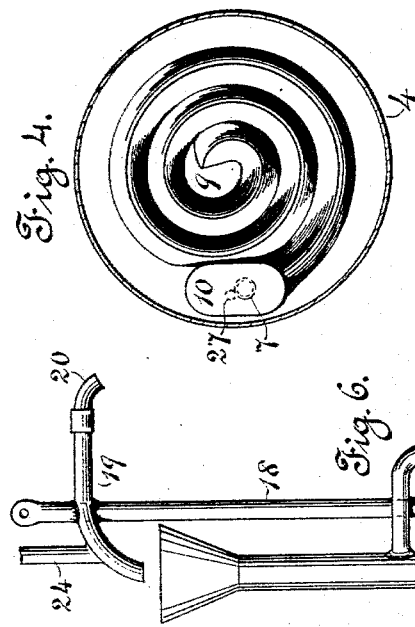
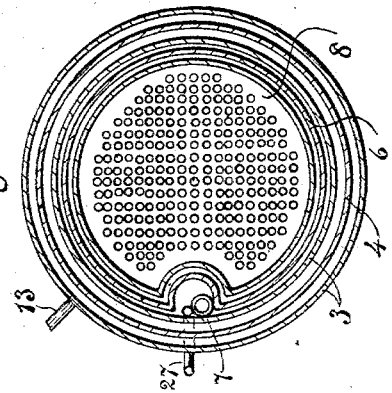
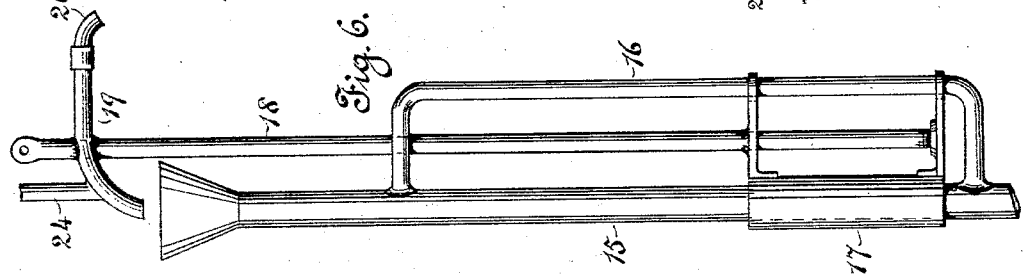
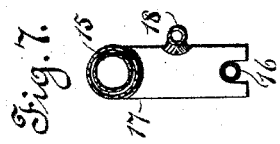
Witnesses
A. S. Diven
H. H. Mills
Inventor
John C. Gallagher
by Eugene Diven
Attorney
THE NORRIS PETERS CO., PHOTO-LITHO., WASHINGTON, D. C.

UNITED STATES PATENT OFFICE.

JOHN C. GALLAGHER, OF ELMIRA, NEW YORK, ASSIGNOR OF TWO-THIRDS TO DAVID W. PAYNE AND M. C. ARNOT, OF SAME PLACE.

PROCESS OF AND APPARATUS FOR GENERATING ACETYLENE GAS.

SPECIFICATION forming part of Letters Patent No. 589,713, dated September 7, 1897.

Application filed March 10, 1896. Serial No. 582,574. (No model.)

*To all whom it may concern:*

Be it known that I, JOHN C. GALLAGHER, a citizen of the United States, residing at Elmira, in the county of Chemung and State of New York, have invented certain new and useful Improvements in Gas-Generators, of which the following is a specification.

My invention relates to improvements in apparatus for generating illuminating-gas by the union of a solid and a liquid, and applies more particularly to the generation of acetylene gas by the decomposition of the metallic carbids with water.

The objects of my invention are, first, to provide an apparatus that can be built in a light, compact, and portable form and of a capacity sufficient to supply small local plants, such as country residences, &c.; second, to provide means for automatically regulating the supply of water to the carbid in accordance with the accumulation of gas in the gasholder, so that the generation of gas shall be stopped immediately the gas-holder is full and started again as soon as gas is consumed and the holder begins to fall; third, to so arrange the carbid-receptacle and its connections that it may be recharged while gas continues to be taken from the holder; fourth, to provide means for taking the gas from the top of the generator in a cooled and dry condition and conducting it away to the gasholder as rapidly as it is generated; fifth, to provide means for decomposing all the carbids in the generator, together with an indicator to show when the carbid is exhausted, and, sixth, to provide means for driving the gas from the generator after the carbid is exhausted and before the cover is to be removed to recharge the generator. I attain these objects by the mechanism illustrated in the accompanying drawings, in which—

Figure 1 is a front elevation of the entire machine; Fig. 2, a side elevation, the gasholder being shown in cross-section; Fig. 3, a vertical section of the gas-generator; Fig. 4, a horizontal section of the generator on the line $xx$ in Fig. 3; Fig. 5, a horizontal section on the line $yy$ in Fig. 3, and Figs. 6 and 7 detail views showing the construction of the water-supply regulator.

Similar numerals refer to similar parts throughout the several views.

The gas-generator 1 is fastened by brackets or other suitable means to the side of the gasholder 2. The construction of the generator is shown in Figs. 3, 4, and 5, in which 3 is a cylindrical shell formed with double walls, the space between which is filled with water. The cover 4 slips down into the water within these walls, and this forms a seal and water-jacket. A diaphragm 5 is located at some little distance above the bottom of the shell and forms the bottom proper of the generator. This is to give the water seal sufficient depth to withstand the desired gas-pressure. Upon this bottom rests the removable vessel 6, which is provided with a bent-in portion at one side to form a groove through which passes the gas-discharge pipe 7. Within the vessel 6 is a perforated cage 8, which conforms to it in shape, a space being left between the two on all sides, the bottom of the cage having feet attached thereto in order to raise it above the bottom of the vessel 6.

The cover 4 is provided with a diaphragm below its top to form a water-chamber 9. The diaphragm rests tightly upon the inner wall of the shell 3 in order that water may rise above the top of this wall, as hereinafter described.

A pipe 11 leads to a cold-water supply and an overflow-pipe 12 leads down inside of the water seal formed by the shell 3, a suitable waste-pipe 13 being provided at the outside of the seal. Between the pipe 11 and the water-supply is a shut-off cock and a hose or other flexible connection (not shown) in order that the cover may be lifted from the generator when the carbid is to be renewed. The corrugations in the bottom of the waterchamber 9 are run around spirally and do not reach the top of the chamber. In this way I provide a water-jacket on the top and sides of the generator in which there will be a constant circulation of fresh water. The water entering at 11 follows the spirals of the corrugation, overflows through pipe 12, by which it is directed to the inside column of the water seal, whence it flows down around the bottom of the cover and then up and out through the waste-pipe 13.

Where the apparatus is small and the heat produced by the decomposition of the carbid not great, the circulating connections may be omitted and the chamber 9 simply filled from time to time with water, which will sufficiently absorb the heat given off by the decomposition of the carbid. In the latter case the top of the chamber is left open.

Water is admitted to the carbid through the pipe 14 by an automatic device, which will be next described. The pipe 14 starts from the top of the space between the cage and its containing vessel, passes up through the water-chamber 9, then down and up again to form a seal, the end 15 of the pipe being extended upward a distance sufficient to form a water column that will overcome the pressure at which the gas is designed to be generated. To one side of the pipe 15 is attached the D-shaped pipe or rod 16, which forms a guide and stops for the cross-bars of the sliding frame 17, the inner end of this frame being formed of a piece of pipe that will slide freely on the pipe 15. To the cross-bars of the sliding frame is attached the upright rod 18, which has the curved spout 19 attached to its upper end in such position that the mouth of the spout comes in line with and just above a funnel-shaped opening on the top of pipe 15 when the sliding frame is in its lowest position. From the spout 19 runs a rubber or other flexible tube 20 to the valved outlet from the supply-tank 21, which is suitably located in reference to the apparatus. A chain 22 is fastened to the rod 18 near the sliding frame, its other end being attached to an arm 23, extending out from the top of the gas-holder. The tank 21 is somewhat long and shallow and may be kept full to a constant level by an inlet provided with a float-valve, or it may be of sufficient capacity to run the machine for a certain length of time.

The operation of this automatic water-supply is as follows: When the gas-holder fills and rises to a certain height, the chain 22 is pulled taut. A further rise of the holder draws up the rod 18 and lifts the top of the spout 19 above the water-level in the tank 21. This stops the flow of water until the consumption of gas lowers the holder, when the spout is allowed to drop and the flow started again. The short pipe 24 runs from the top of the spout up as high as the water-level in tank 21, when the spout is in its lowest position, its office being to vent the spout as soon as the top of the spout passes the water-level, so as to prevent siphonage. The tank is made shallow, so that a considerable quantity of water may be used from it without much change in the water-level, in order that the point of automatic shut-off shall remain about constant.

In order to reduce the weight of the water seal for the gas-holder, I make its tank with inner and outer walls, which form an annular water-chamber, into which the holder drops. The top of the inner wall is closed by a diaphragm 25, through which pass the ends of the pipe 7 from the generator and the pipe 26, which leads away to the service-pipes. The holder is provided with the usual uprights and guiding-rollers.

The bent pipe 27 forms the indicator and may also act as a pressure-gage to show the amount of gas-pressure in the generator. It starts from the small chamber 10 on a level with the top of the corrugations, runs down alongside pipe 7, and then up outside the generator to a point somewhat below the top of pipe 7, the length of the bend being sufficient to form a proper water seal. Its action as an indicator will appear farther on. To form it into a pressure-gage, I make the outside portion of glass graduated, as shown, to mark inches of pressure, the water standing in it at the zero-mark when the cover is placed on the generator and before gas begins to be produced. Gas-pressure in the generator forces the water down one leg and up the other, the amount of pressure being indicated by the scale. A petcock is placed at the bend of the pipe in order that the water may be drawn down to the zero-mark after the pipe has been flooded, as will presently appear.

To start the machine, calcium or other carbid in a broken state is placed in the cage 8 and the cover 4 is put on, being fastened down in any suitable manner. The weight of the water in the chamber 9 may be sufficient where the gas-pressure is light. The valve at the water-supply tank is opened, the amount of opening being proportionate to the rapidity with which the gas is to be made. Water then begins to flow from the pipe 14 down between the cage 8 and its containing vessel 6, spreads over the bottom of the latter, and rises through the perforations in the bottom of the cage and attacks the carbid. Gas is immediately given off and rises through the fresh carbid above. Any moisture that may be contained in the gas is thus taken up by the upper layers of carbid and dry gas rises to the top of the generator, where it comes in contact with the large cooling-surface presented by the corrugations of the water-chamber 9 and is taken off to the holder by the pipe 7, which receives the gas from the top of the small chamber 10, into which it has passed from the corrugations in a dry and cooled condition.

When the generator is first put in operation, the petcock 28, which is connected with the top of the generating-chamber, is opened to allow the air to be driven out, the cock 29 being closed during this period. When gas escapes through the petcock, it is closed and cock 29 opened. Gas now continues to form until the holder rises and shuts off the water-supply, as has already been described.

When consumption of gas begins, the holder will gradually drop, at the same time gradually turning on the water-supply until the delivery of water to the generator is such that the generation of the gas will be equal to its consumption, after which the holder will remain practically stationary and the inflow of water to the generator will correspond to the position of the holder, both fluctuating, however, as the speed of the gas consumption becomes greater or less. For instance, should the speed of consumption increase, the holder will drop, at the same time lowering the spout and increasing the head of flow from the supply-tank. The water will then be fed into the generator more rapidly and the generation of gas will be increased until it is equal to the consumption, after which the holder and spout will again remain stationary in the position requisite to maintain this equilibrium between supply and demand. It will thus be seen that when gas is being consumed its production in the generator will be continuous and proportionate to the speed of consumption, since a slight drop in the holder will gradually turn on the water-supply, the flow of water being proportionate to the drop of the holder. By causing the holder to actuate the water-supply at the beginning of its drop I avoid the intermittent generation of gas that would follow if the holder were to act upon the water-supply only when near the bottom of its drop, and in this way I avoid the danger of unduly increasing the pressure of gas in the generator due to suddenly turning in the water at full head. The holder is kept full all the time and delivers the gas to the service-pipes under a continuous and steady pressure. The gas-pressure is regulated by the weight of the holder, and the water delivery is made to correspond to the desired pressure, since the column as arranged will only let water into the generator when the pressure therein is below the desired maximum pressure.

The water in the vessel 6 gradually rises, reaching into the carbid from the bottom and side perforations of the cage and decomposing all of the carbid in the cage, after which it continues to rise, driving the gas ahead of it until it overflows through the pipe 27, which is on a level with the top of the corrugations and is of sufficient capacity to carry the water away as fast as it flows in. The overflow from pipe 27 indicates that the carbid is exhausted. Cock 29 is now closed and petcock 28 opened to allow air to pass through and permit the cover to be lifted off. Vessel 6 is then lifted out and it and the cage 8 washed free of the hydrated oxid that results from the decomposition. After the vessel and cage are dried a fresh charge of carbid is placed in the cage and the generator reset ready to repeat the operation, as above set forth. This renewal takes but a short time and can be done while the gas continues to be taken from the holder and before it can become exhausted.

It will be noticed that all the gas will be driven out of the generator before the cover is to be taken off, with the exception of the small quantity trapped in the top of chamber 10 and pipe 7 above the cock 29. This quantity is so slight that there can be no danger attendant upon the removal of the cover.

The petcock 30 is to be used to free pipe 7 of any water which may be carried over into it from the generator or which may form therein by condensation.

Two or more generators may be located about the gas-holder, in which case they may be charged alternately. Moreover it is not necessary that the generators shall be attached to the gas-holders, it only being required that they be so located that the water-inlets may be connected to the holder, so as to be automatically actuated by its rise and fall.

It will readily be seen that my machine may be made very small and of light sheet metal, or on a much larger scale and of heavier material, according to the demand for a large or small supply of gas; but a very large plant is not required in any case, as the gas may be generated from the carbid as fast as consumed, it only being necessary to properly manipulate the water-supply.

I am aware that prior to my invention machines have been made in which acetylene gas is manufactured from carbids by the union therewith of water, also that provisions have been made for automatically supplying the water to the carbid, and I do not therefore claim these things broadly.

What I do claim as my invention, and desire to secure by Letters Patent, is—

1. The process of manufacturing gas by bringing into contact with each other a solid and a liquid which consists in delivering the liquid to the solid from a source of supply and in so automatically regulating the head of flow from the source of supply that the generation of gas shall be continuous during consumption and proportionate to the speed of consumption.

2. The process of manufacturing gas by bringing into contact with each other a solid and a liquid which consists in delivering the liquid to the solid through the medium of a column of the liquid, in delivering the liquid to the column from a fixed source of supply, and in so automatically regulating the head of flow from the source of supply that the generation of gas shall be continuous during consumption and proportionate to the speed of consumption.

3. In a gas-generating apparatus, in combination, an elevated supply-tank, a spout leading from the tank, a flexible connection between spout and tank, a generating-chamber, a liquid-sealed column entering the chamber to deliver liquid thereto and having its open end located beneath the spout, a gas-holder connected with the generating-chamber, and a connection between gas-holder and spout whereby the spout is made to rise and fall in conformity with the rise and fall of the holder to automatically adjust the head of flow from the supply-tank.

4. In a gas apparatus of the character described, an automatic liquid-delivery system composed of a source of supply in which the liquid is held at an approximately constant level, a sealed liquid column, a spout delivering into the top of the column, a flexible connection between the spout and source of supply, a gas-holder, and a connection between the spout and gas-holder whereby the spout is raised above the supply-level when the holder is full.

5. In a gas apparatus of the character described, an automatic liquid-delivery system composed of a sealed liquid column, a spout delivering into the top of the column, a flexible connection between the spout and the source of liquid-supply, a sliding frame attached to the spout, suitably-located guides for the frame, a gas-holder, and a connection between the frame and holder whereby the spout is raised above the supply-level when the holder is full.

6. In a gas apparatus of the character described, an automatic liquid-delivery system composed of a sealed liquid column, a curved spout delivering into the top of the column, a flexible connection between the spout and the source of liquid-supply, a vent-pipe at the top of the spout of sufficient length to extend above the supply-level when the spout is in its lowest position, a gas-holder, and a connection between the spout and holder whereby the spout is raised by the holder and the liquid delivery is stopped immediately the top of the spout is raised above the supply-level.

7. In a gas-generating apparatus, in combination, a generating-chamber, a perforate receptacle therein for containing a solid, an inlet to the generating-chamber arranged to deliver a liquid to the solid from the bottom and sides of the perforate receptacle, a gas-outlet from the top of the chamber, and a sealed overflow leading from the chamber at a point below the gas-outlet, whereby the liquid is allowed to fill the chamber and is drawn off before it reaches the gas-outlet.

8. In a gas-generating apparatus, the combination of a generating-chamber, an inlet thereto from a source of liquid-supply, a gas-outlet from the top of the chamber, and an indicator for the purpose described, consisting of a tube which leads from the chamber at a point below the gas-outlet, extends thence downward and then upward outside the chamber to form a liquid seal, and terminates with an open end at a point also below the gas-outlet.

9. In a gas-generating apparatus, the combination of a generating-chamber, an inlet thereto from a source of liquid-supply, a gas-outlet from the top of the chamber, and a combined indicator and pressure-gage consisting of a tube which leads from the chamber at a point slightly below the gas-outlet, extends thence downward and then upward outside the chamber to form a liquid seal, and terminates with an open end at a point also below the gas-outlet, the outer extremity of the tube being of glass and having thereon a properly-graduated scale, and a petcock located at the bend of the tube in order that the liquid may be drawn down to the zero-point of the scale after the tube has been flooded.

10. In a gas-generating apparatus, the combination with the generating-chamber of a cover therefor having a diaphragm below its top to form a cooling-chamber across the top of the generating-chamber, said diaphragm being provided with an upward projection to form a small chamber open to the generating-chamber and adapted to be covered by the substance in the cooling-chamber, and a gas-outlet leading from the top of said small chamber.

11. In a gas-generating apparatus, the combination with the generating-chamber of a cover therefor having a corrugated diaphragm below its top to form a cooling-chamber across the top of the generating-chamber, said diaphragm being provided with an upward projection to form a small chamber open to the generating-chamber and to the corrugations, and a gas-outlet leading from the top of said small chamber.

12. In a gas-generating apparatus, the combination of a receptacle for holding a solid, a water-sealed cover therefor, a water-chamber formed in the cover above the receptacle, spiral corrugations in the bottom of the water-chamber, a supply-pipe leading to the water-chamber, an overflow-pipe therefrom leading to the water seal for the cover, an overflow from the water seal, a delivery-pipe from a source of liquid-supply passing through the cover to deliver liquid to the solid in the receptacle, a small chamber formed in the bottom of the water-chamber and connected with the corrugations, and a gas-outlet leading from said small chamber.

In testimony whereof I have affixed my signature in presence of two witnesses.

JOHN C. GALLAGHER.

Witnesses:
EUGENE DIVEN,
HOLLIS H. MILLS.